Figure 3:
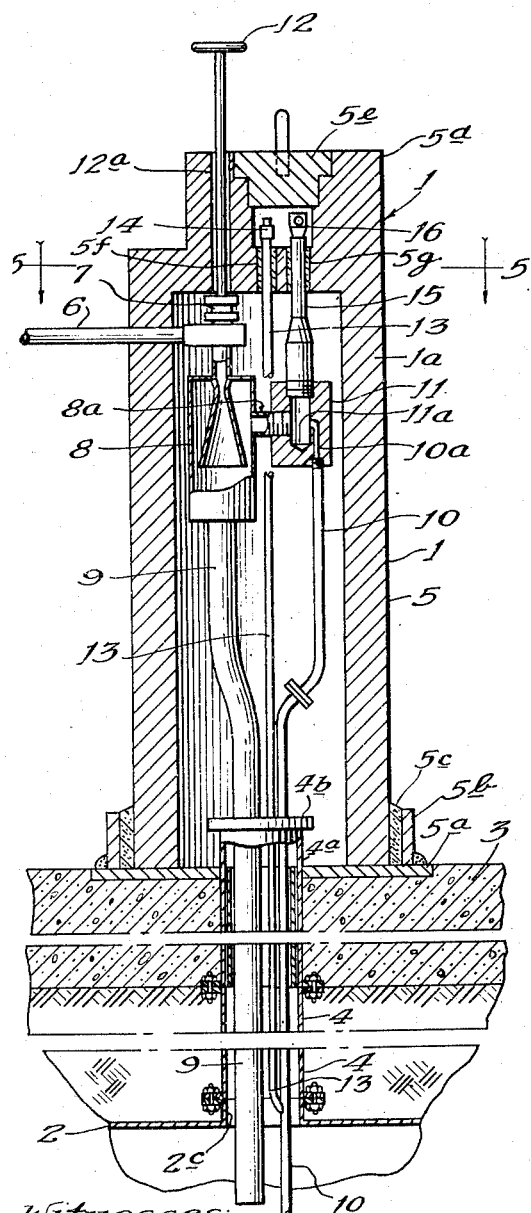

Feb. 6, 1951        S. L. HANDFORTH        2,540,944
SAMPLING APPARATUS
Filed July 21, 1945                              2 Sheets-Sheet 1
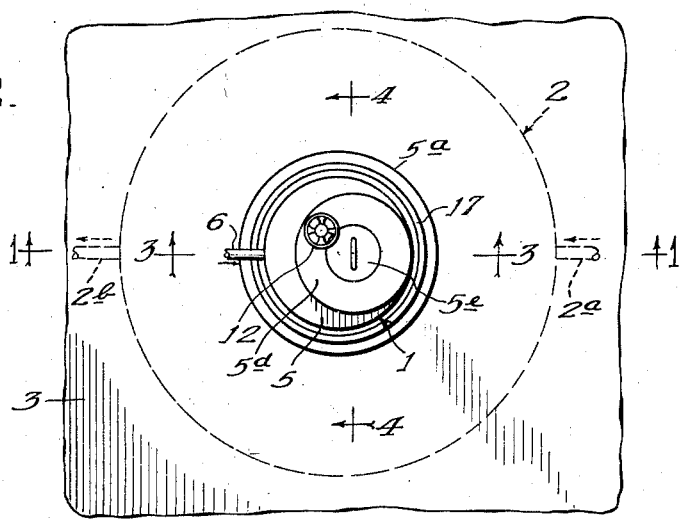
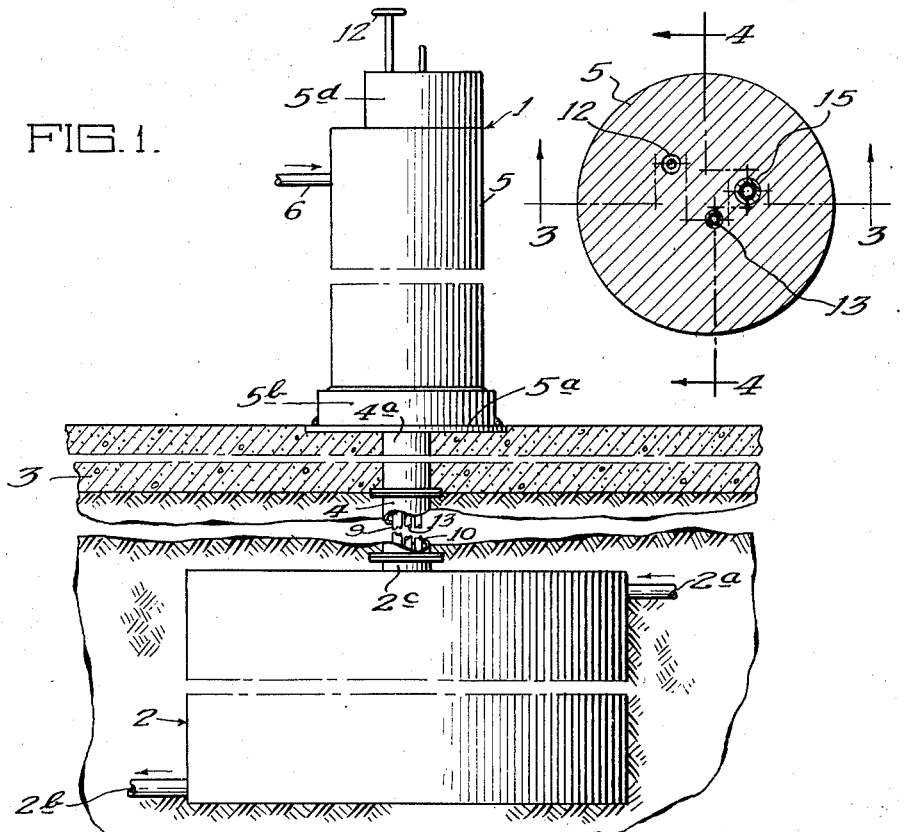
Witnesses:
Herbert E. Metcalf
Paul J. Glaister
Inventor:
Stanley L. Handforth
By Robert A. Surrender
Attorney Feb. 6, 1951 S. L. HANDFORTH 2,540,944
SAMPLING APPARATUS Filed July 21, 1945 2 Sheets-Sheet 2

Inventor:
Stanley L. Handforth

Patented Feb. 6, 1951

2,540,944

UNITED STATES PATENT OFFICE 2,540,944

SAMPLING APPARATUS

Stanley L. Handforth, Wilmington, Del., assignor to the United States of America as represented by the United States Atomic Energy Commission Application July 21, 1945, Serial No. 606,402

7 Claims. (Cl. 73—422)

The present invention relates generally to sampling apparatus and has particular relation to apparatus and methods for obtaining representative samples from relatively large bodies of radioactive or other liquids inherently dangerous to handle.

In carrying out certain chemical reaction procedures, such as the concentration of radioactive, metallic isotopes, the most suitable method of determining the progress of the reaction is by periodic, direct examination of a sample of the reacting material, and frequently this examination involves a check of its radioactive properties by the use of radiaton counters. However, despite the need therefor the obtaining of a suitable representative sample from a large body of radioactive, reacting liquid has proven a very difficult problem. Conventional sampling methods are unsatisfactory, chiefly because of the risk of serious injury to personnel which accompanies exposure to the high density radiations emanating from the main body of the reacting liquid, and the various suggested procedures, some of which involved rather complicated apparatus, have proven unreliable or otherwise unsatisfactory.

Hence the principal object of the present invention is to provide a sampling apparatus and method, particularly adapted for use in connection with processes involving large bodies of radioactive liquids, which will make available small, representative samples of the body of liquid, as such samples may be required, and which will make possible the obtaining and handling of such samples without risk of injury to the operating personnel. A further object of the invention is to provide sampling apparatus in accordance with the above stated principal object which shall be simple in design, reliable and easy to operate, and sufficiently foolproof that it will rarely if ever become inoperative.

Figure 4:
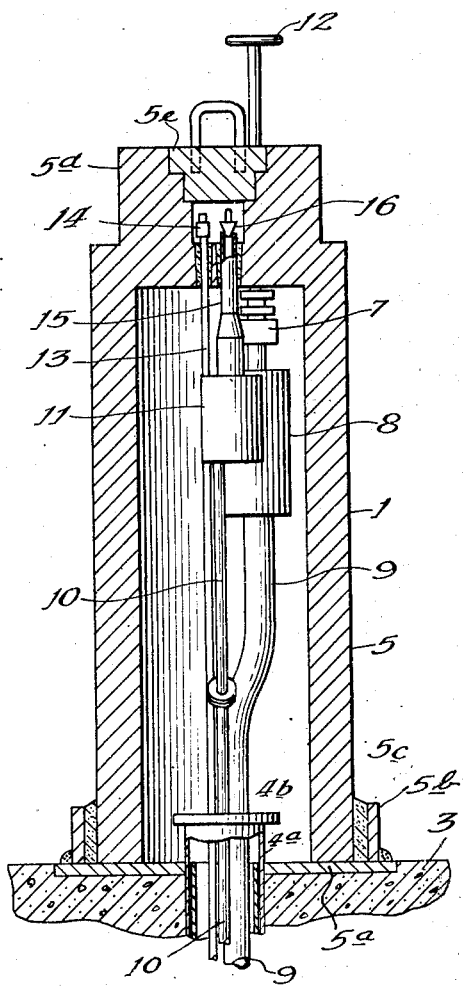

Other objects as well as the features of the apparatus, the various novel structural arrangements and combinations utilized therein, and the details of the method, which I have discovered, will be made more apparent by reference to the accompanying drawings and the following description of a preferred embodiment thereof. In the drawings, Fig. 1 is a side, elevational view, partially in section, of a reaction tank provided with a sampling apparatus in accordance with this invention;

Fig. 2 is a plan view of the structure shown in Fig. 1;

Figs. 3 and 4 are enlarged sectional views of the sampling apparatus, taken on the general lines 3—3 and 4—4 of Fig. 2, and Figure 5 is a plan sectional view taken along the line 5—5 of Figure 3.

The apparatus illustrated in the drawings includes a reaction tank 2 of relatively large volume for containing the reacting liquid. The tank 2 is provided with inlet and outlet piping 2a and 2b for the reacting liquid and with a central, flanged access fitting 2c for the sampling apparatus, which is indicated generally at 1. Except for the openings provided by the piping 2a and 2b and the access fitting 2c, the tank 2 is completely closed. In view of the fact that highly radioactive materials will normally be contained therein, the tank 2 is either sunk in the ground, as illustrated, or it is enclosed in a radiation shield, preferably of massive, cast, concrete construction several feet thick.

The sampling apparatus 1 is located above the reaction tank 2, and to protect the operating personnel a thick, concrete shield 3 should be provided over the top of the tank. A duct connection which extends from the access fitting 2c in the top of the tank 2 and through the shield 3 to the bottom of the sampling apparatus 1 is provided by means of suitable pipe sections 4 and 4a.

The various structural elements of the sampling apparatus are enclosed within a generally cylindrical radiation shield 5 which is adapted to rest on a circular, metallic plate 5a embedded in the shield 3. The shield 5 is open at its lower end and is held in proper position relative to the support plate 5a and to the other elements of the apparatus by means of an upstanding tubular guide or baffle 5b which is of somewhat larger diameter than the shield proper. To obviate any possibility of radiation leakage, the space between the main shield 5 and the guide 5b is filled with lead wool or other packing capable of shielding against radiation as illustrated at 5c. In a particularly satisfactory embodiment of the invention, the shield 5 is made of lead with side walls approximately two inches thick, the entire shield 5 having an overall length of about 24 inches and an internal diameter of about 5 inches.

The upper end of the shield 5 is provided with a hollow boss 5d which is positioned slightly off center and which is adapted to be closed by a removable lead cover 5e. Two spaced passageways 5f and 5g extend from the interior of the hollow boss 5d through the top wall of the shield 5 into the interior of the shield. An air inlet conduit 13 extends through the passageway 5f and a sampling tube 15 which connects at its lower end with a cuplike sample container 11 extends through the other passageway 5g. Lead wool is packed in the space between the walls of the passageways 5f and 5g and the members extending therethrough to prevent radiation leakage into the interior of the boss 5d.

During the operation of the apparatus, liquid is drawn into hollow interior 11a of the sample container 11 by means of a steam jet aspirator 8, and the sample container 11 may be conveniently supported upon the aspirator by means such as the short circuit 8a which serves the further function of connecting the interior 11a of the sample container with the low pressure portion of the aspirator. The inlet end of the aspirator 8 is connected to a suitable steam inlet line 6 through a valve 7 having an operating handle 12 which is conducted through the shield 5 and the boss 5d by a suitable opening 12a formed therein. The outlet end of the aspirator 8 is connected to the interior of the reaction tank 2 by suitable piping 9, and preferably terminates above the normal liquid level in that tank. The piping 9 is welded or otherwise affixed to a cap member 4b at the upper end of the pipe section 4a and serves as the main support for the aspirator 8 and the sample container 11.

An updraft conduit 10 extends from the interior 11a of the sample container 11 to a point below the normal liquid level in the reaction tank, the upper end of the conduit 10 connecting with the inlet passageway 10a provided in the walls of the sample container 11. A small quantity of the liquid which is drawn through the updraft conduit 10 during the operation of the sampling apparatus will be retained in the space 11a within the container due to the fact that the connection between the aspirator 8 and the sample container 11 provided by the conduit 8a is raised above the bottom of the space 11a in the container. Any excess liquid moved into the space 11a will overflow into the aspirator and be returned to the main body of liquid in the reaction tank 2. The operation of the sampling apparatus thus effects continuous sampling of the contents of the reaction tank 2, and at the same time, since the inlet and overflow outlet openings in the sample container 11 are spaced apart some distance and the entire operation is accompanied by intermittent turbulence, through intermixing of the liquid retained in the sample container 11 and the incoming liquid will continuously exert an effect upon the liquid retained. This assures that the sample retained in the sample container 11 shall be accurately representative of the contents of the reaction tank 2 at any particular instant.

Since the aspirator 8 operates on the vacuum principle, it is necessary that the sampling tube 15 through which samples are removed from the sample container 11 shall be closed during the sample obtaining operation. To accomplish this, the upper end of the sampling tube 15 is finished with a conical bore, and a removable, conically shaped sealing plug 16 is provided for engaging this bore so as to provide a substantial gas tight seal at the upper end of the sampling tube 15.

When it is desired to remove a sample from the sample container 11, the aspirator 8 is shut off, the removable cover 5e is removed, the conically shaped sealing plug 16 for the sampling tube 15 is removed and a suitable capillary pipette, not shown, is inserted into the sample container 11 through the sampling tube 15, whereupon the liquid entrapped in the container may be withdrawn. If the radioactive material is then in a highly radioactive state, it is desirable that these operations be carried out at arms length in order to minimize risk of injury to the operator. It will be apparent that this arrangement thus makes possible the convenient obtaining of a small representative sample of constant volume at any particular time in the operation of the complete apparatus.

In certain instances, it may be found necessary to locate the sampling apparatus at a considerable distance from the reaction tank 2. When this is done, difficulty may be experienced in obtaining continuous movement of liquid from the reaction tank 2 into the sample container 8 due to the well-known lift limitations of jet type aspirators. To overcome this difficulty, it has been found highly advantageous to provide means for admitting air to the updraft conduit 10 through which liquid is moved from the reaction tank 2 into the sample container 11. This means may conveniently comprise the air inlet conduit 13 which comprises a length of pipe of relatively small diameter which is provided with an orifice plug 14 at its upper end which is open to the atmosphere, and which connects at its lower end with the updraft conduit 10 a short distance above the liquid level in the reaction tank. By proper correlation of the size of the orifice within the orifice plug 14 with the dimensions and pressures encountered in the other parts of the apparatus, the liquid moving upwardly in the updraft conduit 10 will be broken up into small slugs interspersed by bubbles of air, and this arrangement will considerably increase the distance over which the liquid can be raised without using excessively low pressures in the aspirator 8. The arrangement has the further advantage that increased turbulence is produced within the sample container 11 with resultant better intermixing of the contents of that container with the incoming liquid.

When the reacting liquid is corrosive in nature, it will be found highly desirable to manufacture the parts of the apparatus contacted by such liquid of stainless steel or other resistant materials. Particularly good results have been obtained by the use of a stainless steel comprising 25 per cent nickel and 12 per cent chromium, the steel being stabilized with columbium.

In the particular embodiment of the apparatus previously referred to the down pipe 9 from the jet aspirator 8 had an internal diameter of 0.65 inch; the updraft conduit 10 had an internal diameter of about 0.25 inch; the sample container was designed to retain approximately 10 c.c. of liquid therein; the air inlet pipe 13 had an internal diameter of about 0.125 inch; and the orifice at the inlet end of the pipe 13 had a diameter of approximately 0.02 inch. It will be understood that these dimensions can be varied to satisfy the particular requirements of any given installation, and that the capacity of the sample container 11 may likewise be varied as required.

The sampling apparatus described above constitutes a simple and easily operated means for obtaining representative samples from a reaction tank, or the like, containing a large quantity of an inherently dangerous liquid. The apparatus is continuous and automatic in operation, and while it is particularly designed for the obtaining of samples or radioactive liquids, it will be evident that its use is not confined to such materials. The features of the apparatus and the improved sampling method of the invention are expressly pointed out in the accompanying claims.

What is claimed is:

1. In combination, a reaction tank adapted to contain a quantity of liquid, and means for obtaining a representative sample of the liquid contained in said reaction tank comprising a cuplike sample container, a conduit extending from said sample container into the liquid contained in said tank, and means connected to the sample container including an aspirator and a conduit connected thereto which discharges into said reaction tank, operable continuously to move liquid from said reaction tank through said conduit into said sample container and to return the overflow from said container to said reaction tank.

2. In combination, a reaction tank adapted to contain a quantity of liquid, and means for obtaining a representative sample of the liquid contained in said reaction tank comprising a cuplike sample container supported above said reaction tank, a conduit extending downwardly from said sample container into the liquid contained in said tank, and a stream jet aspirator and a conduit connected thereto discharging into said reaction tank and operable continuously to raise liquid from said reaction tank through said conduit into said sample container and to return the overflow from said container to said reaction tank.

3. In combination, a reaction tank adapted to contain a body of liquid, and means for obtaining a representative sample of the liquid contained in said reaction tank comprising a cuplike sample container of predetermined, limited capacity, conduit means extending from the interior of said container into the liquid contained in said tank, means connected to the sample container, including an aspirator and a conduit connected thereto which discharges into said tank, operable to create a pressure differential between the interior of said sample container and the body of liquid contained in said tank whereby liquid will be moved through said conduit into said container, means for admitting small quantities of air to said conduit to break up the liquid moved therethrough into small slugs which are spaced apart by air bubbles, and means for conducting any overflow from said container into said aspirator whereby it will be returned to the body of liquid in said tank.

4. In combination, a reaction tank adapted to contain a body of liquid, and means for obtaining a representative sample of the liquid contained in said reaction tank comprising a cuplike sample container of limited capacity which is normally closed except for two openings therein and which is supported above said tank, a conduit connecting with one of said openings and extending downwardly from said container into the liquid contained in said tank, a steam jet aspirator connected to the other opening in said container and a conduit adapted to discharge the aspirator into said tank, said aspirator being operable to raise liquid from said tank through said conduit into said sample container and to return the overflow from said container to said tank, and means including a conduit closed at one end by an orifice plug and connected at the other end to said conduit means, intermediate the ends thereof, for admitting air to said conduit means to break up the liquid moved therethrough into small slugs spaced apart by air bubbles.

5. Liquid sampler apparatus comprising, in combination, a sealed sample chamber, an updraft conduit connected to the sample chamber at a level above the bottom thereof, an overflow conduit in the sample chamber at a level above the bottom thereof, exhaust means in communication with the overflow conduit, and an air inlet to the updraft conduit at a level below the sample chamber, whereby the bottom of the sample chamber continuously contains a sample of fixed amount corresponding to the instantaneous condition of the liquid being sampled.

6. The apparatus of claim 5 wherein the updraft conduit connection and the overflow conduit are in diametrically opposed portions of the wall of the sample chamber.

7. Liquid sampler apparatus comprising, in combination, a sealed sample chamber, an updraft conduit connected to the sample chamber, a vertical fluid flow conduit including an aspirator portion adjacent to the sample chamber, a horizontal conduit connected between said aspirator portion and the sample chamber at a level above the bottom of the sample chamber, and an air inlet to the updraft conduit at a level below the sample chamber, whereby the bottom of the sample chamber continuously contains a sample of fixed amount corresponding to the instantaneous condition of the liquid being sampled.

STANLEY L. HANDFORTH.

REFERENCES CITED

The following references are of record in the file of this patent:

UNITED STATES PATENTS

| Number | Name | Date |
| --- | --- | --- |
| 330,366 | Arthur | Nov. 17, 1885 |
| 364,512 | Harrison | June 7, 1887 |
| 2,225,798 | Price | Dec. 24, 1940 |
| 2,350,323 | Cochran et al. | June 6, 1944 |
| 2,386,282 | Watson et al. | Oct. 9, 1945 |